US012620860B2

(12) United States Patent
Kocherscheidt et al.

(10) Patent No.: US 12,620,860 B2
(45) Date of Patent: May 5, 2026

(54) DRIVE UNIT FOR A VEHICLE

(71) Applicant: Robert Bosch GmbH, Stuttgart (DE)

(72) Inventors: Johannes Daniel Kocherscheidt, Hessigheim (DE); Timo Kiekbusch, Ludwigsburg (DE); Philipp Jung, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 383 days.

(21) Appl. No.: 18/020,397

(22) PCT Filed: Jul. 26, 2021

(86) PCT No.: PCT/EP2021/070787
§ 371 (c)(1),
(2) Date: Feb. 8, 2023

(87) PCT Pub. No.: WO2022/033847
PCT Pub. Date: Feb. 17, 2022

(65) Prior Publication Data
US 2023/0268794 A1      Aug. 24, 2023

(51) Int. Cl.
*H02K 5/173*          (2006.01)
*F16C 3/02*           (2006.01)
(Continued)

(52) U.S. Cl.
CPC ............. *H02K 5/1732* (2013.01); *F16C 3/02* (2013.01); *F16C 19/548* (2013.01);
(Continued)

(58) Field of Classification Search
CPC ...... H02K 5/1732; H02K 7/083; H02K 7/003; H02K 7/08; F16C 3/02; F16C 19/548;
(Continued)

(56) References Cited

U.S. PATENT DOCUMENTS 2,147,879 A * 2/1939 Burmeister ............ B65G 33/32
403/26
6,952,061 B2 * 10/2005 Mogi ....................... H02K 5/24
(Continued)

FOREIGN PATENT DOCUMENTS

CN          103047272 A       4/2013
CN          206708244 U      12/2017
(Continued)

OTHER PUBLICATIONS

Selection of FAG bearing arrangement, Nodes Technology Co., Hong Kong, retrieved from the internet 20250202 at <https: www. nodeshk.com>. (Year: 2016).*

(Continued)

*Primary Examiner* — Greg Binda
(74) *Attorney, Agent, or Firm* — Michael Best & Friedrich LLP

(57) ABSTRACT

A drive unit (10) for a vehicle including an electric machine (12) having a rotor shaft (14) and a transmission (16) with a transmission shaft (18). The transmission shaft (18) is rotatably mounted in a first housing section (22) with a first rolling bearing (20) and the rotor shaft (14) is rotatably mounted in a second housing section (26) with a rolling second bearing (24). The transmission shaft (18) and the rotor shaft (14) are coupled to one another in a rotationally fixed manner. A third rolling bearing (28), which has an inner bearing ring (30), is arranged at the transition between the transmission shaft (18) and the rotor shaft (14), The inner bearing ring (30) is in contact with the rotor shaft (14) and the transmission shaft (18) with its inner surface (32).

8 Claims, 2 Drawing Sheets

(51) Int. Cl.
 *F16C 19/54*   (2006.01)
 *F16H 57/00*   (2012.01)
 *H02K 7/08*   (2006.01)
 *H02K 7/00*   (2006.01)

(52) U.S. Cl.
 CPC ......... *F16H 57/0018* (2013.01); *H02K 7/083*
   (2013.01); *F16C 2226/12* (2013.01); *F16C*
   *2226/80* (2013.01); *F16C 2380/26* (2013.01);
   *H02K 7/003* (2013.01); *H02K 7/08* (2013.01)

(58) Field of Classification Search
 CPC .............. F16C 2226/12; F16C 2226/80; F16C
   2380/26; F16H 57/0018
 USPC ............................................. 403/26; 464/178
 See application file for complete search history.

(56)    References Cited

U.S. PATENT DOCUMENTS

| | | | |
|---|---|---|---|
| 8,944,695 B2 * | 2/2015 | Poon | F16C 37/007 |
| 12,241,509 B2 * | 3/2025 | Kraeuter | F16H 57/0476 |
| 12,241,538 B2 * | 3/2025 | Verbridge | H02K 7/116 |
| 2010/0090474 A1 * | 4/2010 | Anguelo | F03D 3/068 |
| | | | 290/55 |
| 2016/0099632 A1 | 4/2016 | Rawlinson | |
| 2017/0175814 A1 | 6/2017 | Ben Abdelounis et al. | |
| 2019/0162236 A1 | 5/2019 | Waldt et al. | |
| 2021/0164554 A1 | 6/2021 | Honzawa | |

FOREIGN PATENT DOCUMENTS

| | | |
|---|---|---|
| DE | 102016206479 A1 | 10/2017 |
| DE | 102018104685 A1 | 9/2019 |
| JP | 2004270886 A | 9/2004 |
| JP | 2007120707 A | 5/2007 |
| JP | 2015216820 A | 12/2015 |

OTHER PUBLICATIONS

Translation of International Search Report for Application No. PCT/EP2021/070787 date Nov. 4, 2021 (2 pages), May 19, 2025.
Dai Yumian, "Assembly," published Jul. 31, 1988, China Railway Publishing House, p. 57 (2 pages including machine English translation).

* cited by examiner

DRIVE UNIT FOR A VEHICLE

BACKGROUND

The invention relates to a drive unit for a vehicle.

A drive unit for a vehicle is known from DE 10 2016 206 479 A1. This drive unit comprises an electric machine having a rotor shaft and a transmission device having a transmission input shaft which is double mounted and comprises an integral pinion, wherein the rotor shaft and the transmission input shaft are inserted into one another. For assembly, in which an assembly mandrel is used and the transmission device is mounted in the transmission housing first, a precise assembly sequence has to be observed.

SUMMARY

According to the invention, a drive unit for a vehicle is proposed, which comprises an electric machine having a rotor shaft and a transmission having a transmission shaft (separate from the rotor shaft). The transmission shaft is rotatably mounted in a first housing section by means of a first rolling bearing and the rotor shaft is rotatably mounted in a second housing section by means of a second rolling bearing.

The transmission shaft and the rotor shaft are coupled to one another in a rotationally fixed manner, wherein a third rolling bearing which comprises an inner bearing ring is disposed at the (axial) transition between the transmission shaft and the rotor shaft, wherein the inner bearing ring abuts the rotor shaft and the transmission shaft with its inner surface.

The transmission shaft and the rotor shaft are thus accommodated (axially in sections) in the inner ring of the third bearing, and the inner ring of the third rolling bearing supports the transmission shaft and the rotor shaft in radial direction. The two shafts can thus be centered directly in the third rolling bearing on the inner surface of the inner bearing ring.

The electric machine and the transmission can consequently be assembled separately. This allows greater flexibility in the assembly sequence of the drive unit, since the electric machine can be built followed by the assembly of the transmission or the transmission can be built followed by the assembly of the electric machine. By centering the transmission shaft and the rotor shaft in the inner bearing ring, there is no need for additional centering elements (e.g., centering surface) to guide the two shafts toward one another. Guiding the shafts through the third rolling bearing moreover makes it possible to achieve higher running accuracy (lower coaxial tolerance) than when guiding the rotor shaft by means of the transmission shaft.

The inner surface of the inner bearing ring can be an inner surface having an (axially) uniform inner diameter throughout or a stepped inner surface having different inner diameters. The first housing section can be a housing of the transmission (transmission housing). The second housing section can be a housing of the electric machine (motor housing).

As already indicated, the rotor shaft and the transmission shaft are disposed coaxially with one another. The transmission shaft can be an input shaft of the transmission.

The rotor shaft and the transmission shaft are configured separately from one another and are coupled to one another in a rotationally fixed manner during assembly of the drive unit. The separate configuration of the transmission shaft and the rotor shaft makes a fit-for-purpose selection of the materials of the shafts possible. The shafts can furthermore be machined separately and, if necessary, heat treated separately (lower masses of the shafts than in the case of a one-piece configuration). Greater flexibility can also be achieved in the configuration of the running gear diameter, the seal diameter, the bearing diameter or a parking lock connection.

The first rolling bearing can be disposed on the end of the transmission shaft facing away from the rotor shaft. The second rolling bearing can be disposed on the end of the rotor shaft facing away from the transmission shaft. The third rolling bearing can be disposed axially between the first and second rolling bearing.

The transmission shaft can be toothed for torque transmission, for example to a further transmission shaft, for example by a gear mounted on the transmission shaft or a toothing configured or, for example cut, in the transmission shaft.

The drive unit can comprise other components. Thus, the electric machine can comprise a rotor that is coupled to the rotor shaft in a rotationally fixed manner. The electric machine can also comprise a stator that interacts electromagnetically with the rotor. The transmission can be a single-stage or multi-stage transmission, for example a spur gear transmission. The drive unit can form an electrical axle for a vehicle.

According to a further development, the third rolling bearing can be seated on the transmission shaft, in particular for the axially predominant part, wherein the inner bearing ring abuts a radial projection on the side facing away from the rotor shaft. Radial and axial forces acting on the transmission shaft, which emanate from a toothing or a parking lock on the transmission shaft, for example, can therefore be introduced directly into the third rolling bearing. There is consequently no need for a further interface for transmitting the forces. The projection can be formed by a shaft shoulder that projects radially relative to the bearing seat or by a separate element, e.g., a securing ring, attached to the transmission shaft. The third rolling bearing can be disposed in the first housing section and can thus rotatably support the transmission shaft and the rotor shaft in the first housing section.

According to a further development, the first rolling bearing and the third rolling bearing can be disposed in the first housing section in an X arrangement or an O arrangement. Axial forces originating from the running gear, for example, can thus be transmitted from the transmission shaft into the first housing section (e.g., transmission housing) in overrun mode and traction mode via a respective rolling bearing. Radial forces acting on the transmission shaft are supported directly by the transmission shaft via the rolling bearings in the first housing section.

The first rolling bearing, the second rolling bearing and/or the third rolling bearing can optionally be axially pretensioned relative to the housing section in which the respective rolling bearing is disposed, in particular by means of springs or shim discs. This contributes to the absorption of axial forces.

According to a further development, the transmission shaft and the rotor shaft can be fastened to one another axially (axially fixed coupling), wherein one bearing of the first rolling bearing and the third rolling bearing is configured as a floating bearing and the respective other bearing as a fixed bearing. Thus, stresses caused by thermal expansion can be reduced and manufacturing tolerances can be compensated.

According to a further development, the rotor shaft can abut the inner surface of the inner bearing ring of the third rolling bearing with an outer peripheral surface, wherein the rotor shaft is supported axially on the inner bearing ring of the third rolling bearing or on the transmission shaft with a radial shoulder (front side oriented in axial direction). Axial forces of the rotor shaft can thus be supported in the direction of the transmission shaft by means of the inner bearing ring. The bearing seat of the transmission shaft, i.e., the portion of the transmission shaft on which the third rolling bearing with the inner bearing ring is seated, and the outer peripheral surface of the rotor shaft can have an identical outer diameter. The inner bearing ring of the third rolling bearing can thus have an axially uniform inner diameter.

According to a further development, the third rolling bearing can comprise an axially extended inner bearing ring that projects axially from the third rolling bearing. Thus, with the same radial size of the rolling bearing, a sufficiently large contact surface enables reliable contact with the rotor shaft and the transmission shaft. This contributes to a radially compact design.

The third rolling bearing can alternatively be implemented as a larger rolling bearing (e.g., with a standard width) than the first rolling bearing and the third rolling bearing. Thus, if the contact surface to the rotor shaft and the transmission shaft is sufficiently large, a conventional rolling bearing can be used. This contributes to a cost-efficient design. With a standard width, the inner bearing ring and the outer bearing ring can the same axial dimensions.

According to a further development, the third rolling bearing can comprise a shoulder having an enlarged inner diameter on the, possibly axially extended, inner bearing ring, wherein the rotor shaft abuts the inner bearing ring with an outer peripheral surface in this shoulder. Axial force can thus be transmitted from the rotor shaft to the inner bearing ring, possibly without or with only slight weakening of the cross-section of the rotor shaft. The shoulder is in particular configured on the end of the inner ring facing the rotor shaft.

According to a further development, the rotor shaft can comprise a step having a reduced outer diameter, wherein the inner bearing ring of the third rolling bearing abuts the rotor shaft with its inner perimeter in this step. Axial force can thus be transmitted from the rotor shaft to the inner bearing ring of the third rolling bearing without weakening the cross-section of the inner bearing ring. The step on the rotor shaft and the bearing seat on the transmission shaft, i.e., the portion of the transmission shaft on which the third rolling bearing with the inner bearing ring is seated, can have the same diameter. The step is in particular configured on the end of the rotor shaft facing the transmission shaft.

According to a further development, the transmission shaft can be configured axially in sections or entirely as a hollow shaft. The transmission shaft can thus comprise a centric opening or a centric passage. This makes it possible to oil or cool the rotor shaft and/or the shaft connection, e.g., a spline. Radial channels can be configured in the transmission shaft and/or in the rotor shaft. Oiling or cooling of bearings and/or seals is thus possible. Regardless of this, it is conceivable for the rotor shaft to be configured axially in sections or entirely as a hollow shaft.

According to a further development, the rotor shaft and the transmission shaft can be connected to one another in a material-locking manner (e.g., by means of welding), a form-locking manner (e.g., by means of a spline) and/or a force-locking manner (e.g., by means of a press fit). This enables a structurally simple and stable connection of the shafts.

The transmission shaft and the rotor shaft can overlap axially and be connected to one another in the overlapping region. An axially projecting pin, which projects into the opening or the passage of the transmission shaft when the shafts are assembled, can be formed on the rotor shaft. An inner toothing can be configured on the inner perimeter of the transmission shaft and an outer toothing can be configured on the outer perimeter of the pin. When mated, the inner toothing and the outer toothing form a spline.

BRIEF DESCRIPTION OF THE DRAWINGS

Possible embodiments of the invention are explained in the following with reference to the accompanying drawings. The figures show.

DETAILED DESCRIPTION

Figure 1:
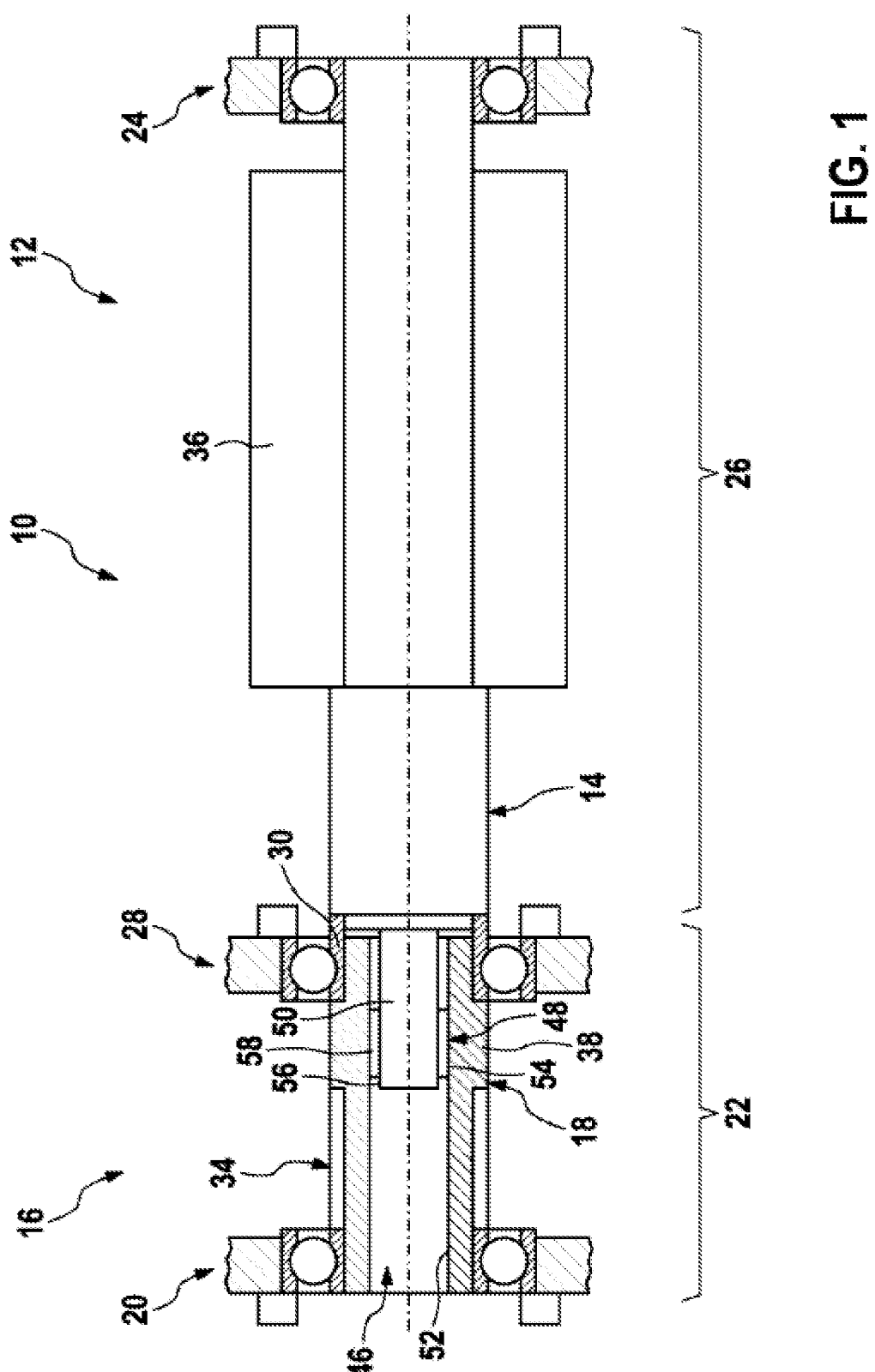
FIG. 1 a schematic section through a drive unit for a vehicle.

In FIG. 1, a drive unit for a vehicle bears the overall reference sign 10. The drive unit 10 comprises an electric machine 12 having a rotor shaft 14 and a transmission 16 having a transmission shaft 18 which is separate from the rotor shaft 14. The transmission shaft 18 is rotatably mounted in a first housing section 22 (not shown) by means of a first rolling bearing 20 and the rotor shaft 14 is rotatably mounted in a second housing section 26 (not shown) by means of a second rolling bearing 24. The first housing section 22 can be a housing of the transmission 16, and the second housing section 26 can be a housing of the electric machine 12 (housing not shown in each case). The housings can comprise one or more (likewise not shown) housing walls, in which bearing seats (without reference signs) for the rolling bearings 20, 24, 28 are configured (bearing seats indicated by hatching).

Figures 2A, 2B:
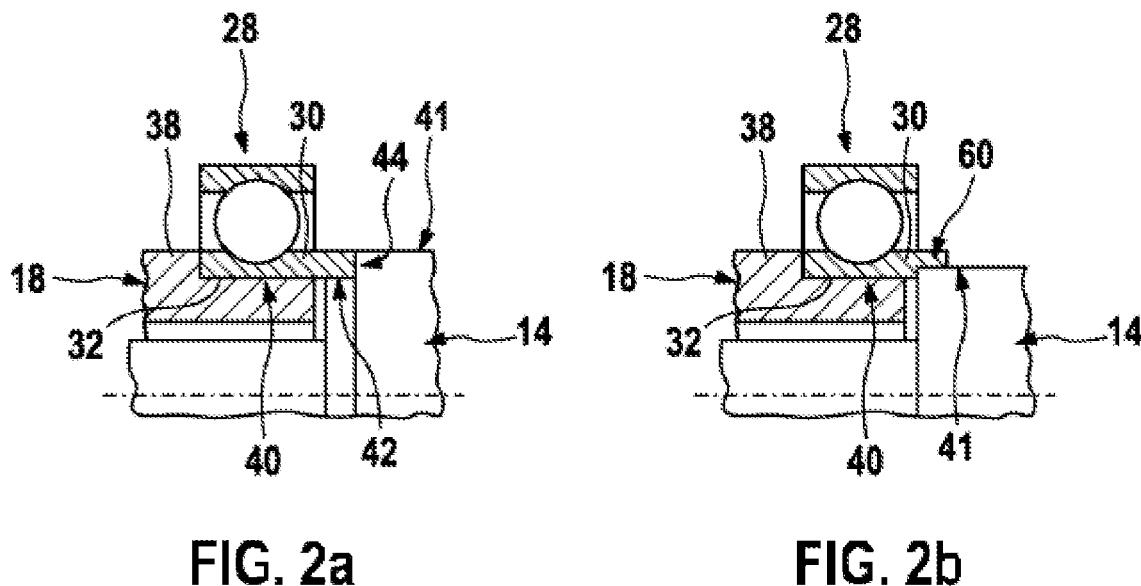
FIG. 2a illustrates the third rolling bearing having an axially extended inner bearing ring that projects axially from the rolling bearing.
FIG. 2b illustrates the third rolling bearing having a shoulder with an enlarged inner diameter on the (axially extended) inner bearing ring.

The transmission shaft 18 and the rotor shaft 14 are coupled to one another in a rotationally fixed manner, wherein a third rolling bearing 28 which comprises an inner bearing ring 30 is disposed at the axial transition between the transmission shaft 18 and the rotor shaft 14, wherein the inner bearing ring 30 abuts the rotor shaft 14 and the transmission shaft 18 with its inner surface 32 (see FIG. 2a).

The inner surface 32 of the inner bearing ring can be an inner surface 32 having an (axially) uniform inner diameter throughout or a stepped inner surface 32 having different inner diameters. The rotor shaft 14 and the transmission shaft 18 are disposed coaxially with one another. The transmission shaft 18 can be an input shaft of the transmission.

The first rolling bearing 20 is disposed on the end of the transmission shaft 18 facing away from the rotor shaft 14.

The second rolling bearing 24 is disposed on the end of the rotor shaft 14 facing away from the transmission shaft 18. The third rolling bearing 28 is disposed axially between the rolling bearings 20, 24. In this example, the transmission shaft 18 comprises a toothing 34 cut into the transmission shaft 18 for torque transmission.

The electric machine 12 comprises a rotor 36 that is coupled to the rotor shaft 14 in a rotationally fixed manner. The electric machine 12 also comprises a (not shown) stator that interacts electromagnetically with the rotor 36. In this example, the drive unit 10 forms an electrical axle for a vehicle.

The third rolling bearing 28 is positioned on the transmission shaft 18 for the axially predominant part, wherein the inner bearing ring 30 abuts a radial projection 38 on the side facing away from the rotor shaft 14. In this example, the projection 38 is formed by a shaft shoulder which projects radially relative to the bearing seat 40, i.e., the portion of the transmission shaft 18 on which the third rolling bearing 28 with the inner bearing ring 30 is seated.

The third rolling bearing 28 is disposed in the first housing section 22 and rotatably supports the transmission shaft 18 and the rotor shaft 14 in the first housing section 22. In this example, the first rolling bearing 20 and the third rolling bearing 28 are disposed in the first housing section 22 in an X arrangement. The rolling bearings 20, 24, 28 can optionally be axially pretensioned as discussed above.

The transmission shaft 18 and the rotor shaft 14 are fastened to one another axially, wherein one bearing of the first rolling bearing 20 and the third rolling bearing 28 is configured as a floating bearing and the respective other bearing as a fixed bearing (not shown in detail).

The mounting on the third rolling bearing 28 according to FIG. 1 is shown enlarged in FIG. 2a. The third rolling bearing 28 comprises an axially extended inner bearing ring 30 that projects axially from the rolling bearing 28. The rotor shaft 14 comprises a step 42 having an outer diameter which is reduced compared to the outer peripheral surface 41, wherein the inner bearing ring 30 of the third rolling bearing 28 abuts the rotor shaft 14 with its inner surface 32 in this step 42. The rotor shaft 14 is supported on the front side on the (extended) inner bearing ring 30 of the rolling bearing 28 with a radial shoulder 44. In this example, the bearing seat 40 of the transmission shaft 18 and the step 42 of the rotor shaft 14 have an identical outer diameter. On the inner surface 32, the inner bearing ring 30 has an axially uniform inner diameter.

The transmission shaft 18 is configured as a hollow shaft comprising a centric passage 46 (see FIG. 1). Oiling or cooling of the rotor shaft 14, and optionally also the shaft connection, is thus possible as discussed above.

In this example, the rotor shaft 14 and the transmission shaft 18 are connected to one another in a form-locking manner, specifically by means of a spline 48 (see FIG. 1). The transmission shaft 18 and rotor shaft 14 overlap axially and are connected to one another in the overlapping region. An axially projecting pin 50, which projects into the passage 46 of the transmission shaft 18 when the shafts 14, 18 are assembled, is formed on the rotor shaft 14.

An inner toothing 54 is configured on the inner perimeter 52 of the transmission shaft 18 and an outer toothing 58 is configured on the outer perimeter 56 of the pin 50. When mated, the inner toothing 54 and the outer toothing 58 form the spline 48.

Figures 2C, 2D:
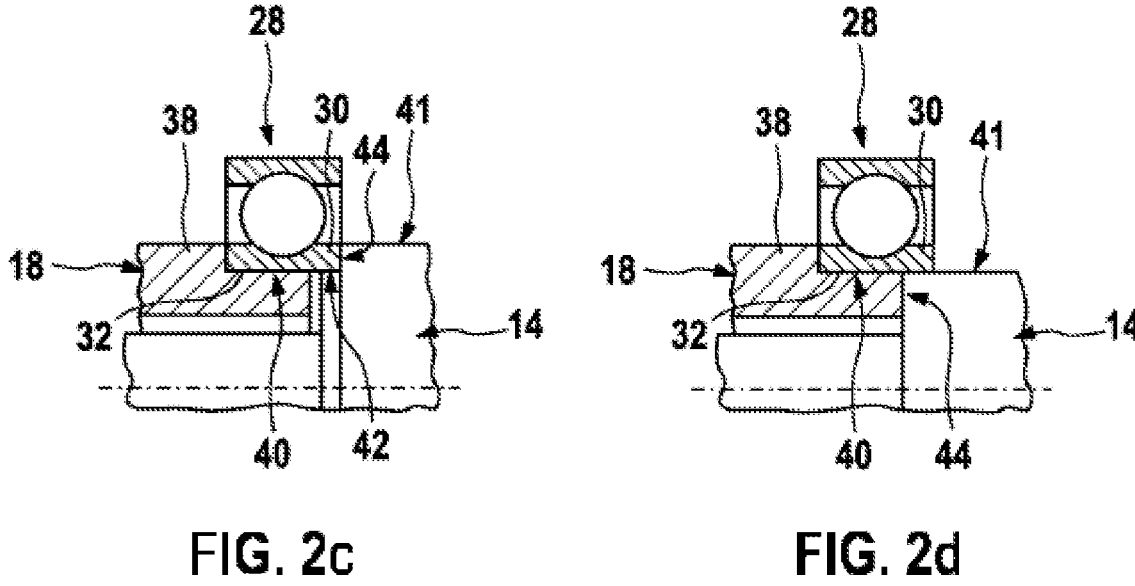
FIG. 2c illustrates the third roller bearing shifted in the direction of the rotor shaft.
FIG. 2d illustrates the third roller bearing disposed on an outer peripheral surface of the rotor shaft and the bearing seat of the transmission shaft, the outer peripheral surface and the bearing seat having an identical outer diameter.

FIGS. 2b to 2d show different options for configuring the mounting on the third rolling bearing 28. Same or functionally same elements are provided with identical reference signs, so that reference is made to the explanations above in order to avoid repetition.

Unlike in FIG. 2a, for the mounting according to FIG. 2b, the rotor shaft 14 does not comprise a radial shoulder 44. Instead, the third rolling bearing 28 comprises a shoulder 60 having an enlarged inner diameter on the (axially extended) inner bearing ring 30, wherein the rotor shaft 14 abuts the inner bearing ring 30 with its outer peripheral surface 41 in this shoulder 60. The shoulder 60 is configured on the end of the rotor shaft 14 facing the transmission shaft 18.

Unlike in FIG. 2a, for the mounting according to FIG. 2c, the inner bearing ring 30 is not axially extended, so that it does not project axially beyond the third rolling bearing 28. The inner bearing ring 30 abuts the rotor shaft 14 in the step 42 with its inner surface 32. The rotor shaft 14 is supported on the front side on the inner bearing ring 30 of the rolling bearing 28 with a radial shoulder 44. Compared to the mounting in FIG. 2a, the rolling bearing 28 in FIG. 2c is shifted further in the direction of the rotor shaft 14.

Unlike in FIG. 2a, for the mounting according to FIG. 2d, the rotor shaft 14 does not comprise a radial shoulder 44 with which the rotor shaft 14 abuts on the front side on the bearing inner ring 30. Instead, the rotor shaft 14 is supported on the front side on the transmission shaft 18 with a radial shoulder 44. The outer peripheral surface 41 of the rotor shaft 14 and the bearing seat 40 of the transmission shaft 18 have an identical outer diameter. The inner bearing ring 30 is not axially extended, so that it does not project axially from the rolling bearing 30. On the inner surface 32, the inner bearing ring 30 has an axially uniform inner diameter.

What is claimed is:

1. A drive unit (10) for a vehicle comprising:
an electric machine (12) having a rotor shaft (14) and a transmission (16) having a transmission shaft (18),
wherein the transmission shaft (18) is rotatably mounted in a first housing section (22) by a first rolling bearing (20) and the rotor shaft (14) is rotatably mounted in a second housing section (26) by a second rolling bearing (24),
wherein the transmission shaft (18) and the rotor shaft (14) are coupled to one another in a rotationally fixed manner,
wherein a third rolling bearing (28) which comprises an inner bearing ring (30) is disposed at a transition between the transmission shaft (18) and the rotor shaft (14),
wherein an inner surface (32) of the inner bearing ring (30) abuts the rotor shaft (14) and the transmission shaft (18),
wherein the third rolling bearing (28) is seated on the transmission shaft (18),
wherein the inner bearing ring (30) abuts a radial projection (38) on a side facing away from the rotor shaft (14), and
wherein the radial projection (38) is formed by a radially projecting shaft shoulder of the transmission shaft (18).

2. The drive unit (10) according to claim 1, wherein the rotor shaft (14) abuts the inner surface (32) of the inner bearing ring (30) of the third rolling bearing (28) with an outer peripheral surface (41),
wherein the rotor shaft (14) is supported axially on the inner bearing ring (30) of the third rolling bearing (28) or on the transmission shaft (18) with a radial shoulder (44).

3. The drive unit (10) according to claim 1, wherein the third rolling bearing (28) comprises an axially extended inner bearing ring (30) which projects axially from the third rolling bearing (28).

4. The drive unit (10) according to claim 3, wherein the third rolling bearing (28) comprises a shoulder (60) having an enlarged inner diameter on the inner bearing ring (30), wherein the rotor shaft (14) abuts the inner bearing ring (30) with an outer peripheral surface (41) in this shoulder (60).

5. The drive unit (10) according to claim 1, wherein the rotor shaft (14) comprises a step (42) having a reduced outer diameter, wherein the inner surface (32) of the inner bearing ring (30) of the third rolling bearing (28) abuts the rotor shaft (14) at this step (42).

6. The drive unit (10) according to claim 1, wherein the transmission shaft (18) is configured axially in sections or entirely as a hollow shaft.

7. The drive unit (10) according to claim 1, wherein the rotor shaft (14) and the transmission shaft (18) are connected to one another in a material-locking, form-locking and/or force-locking manner.

8. A drive unit (10) for a vehicle comprising:

an electric machine (12) having a rotor shaft (14) and a transmission (16) having a transmission shaft (18), wherein the transmission shaft (18) is rotatably mounted in a first housing section (22) by a first rolling bearing (20) and the rotor shaft (14) is rotatably mounted in a second housing section (26) by a second rolling bearing (24), wherein the transmission shaft (18) and the rotor shaft (14) are coupled to one another in a rotationally fixed manner, wherein a third rolling bearing (28) which comprises an inner bearing ring (30) is disposed at a transition between the transmission shaft (18) and the rotor shaft (14), wherein an inner surface (32) of the inner bearing ring (30) abuts the rotor shaft (14) and the transmission shaft (18), wherein the third rolling bearing (28) comprises an axially extended inner bearing ring (30) which projects axially from the third rolling bearing (28), wherein the third rolling bearing (28) comprises a shoulder (60) having an enlarged inner diameter on the inner bearing ring (30), and wherein the rotor shaft (14) abuts the inner bearing ring (30) with an outer peripheral surface (41) in this shoulder (60).

* * * * *